(12) United States Patent
Lee

(10) Patent No.: US 6,335,762 B1
(45) Date of Patent: Jan. 1, 2002

(54) CIRCUIT AND METHOD FOR DETERMINING RECEIVED SIGNAL

(75) Inventor: Myeong-hwan Lee, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/122,631

(22) Filed: Jul. 27, 1998

(30) Foreign Application Priority Data

Aug. 1, 1997 (KR) .................................................. 97-36884

(51) Int. Cl.[7] .............................. H04N 5/44; H04N 5/46; H04N 5/21; H04N 3/27; H04N 5/50
(52) U.S. Cl. .......................... 348/558; 348/553; 348/554; 348/555; 348/556; 348/614; 348/725; 348/735
(58) Field of Search ..................................... 348/554, 555, 348/556, 558, 614, 553, 725, 735

(56) References Cited

U.S. PATENT DOCUMENTS

| | | | | |
|---|---|---|---|---|
| 5,173,774 A | * | 12/1992 | Bretl et al. ................... | 358/140 |
| 5,283,653 A | * | 2/1994 | Citta ............................. | 348/725 |
| 5,307,165 A | * | 4/1994 | Kawashima ................... | 348/441 |
| 5,461,427 A | * | 10/1995 | Duffield et al. .............. | 348/555 |
| 5,461,428 A | * | 10/1995 | Yoo ............................... | 348/558 |
| 5,557,337 A | * | 9/1996 | Scarpa .......................... | 348/558 |
| 5,592,235 A | * | 1/1997 | Park et al. .................... | 348/555 |
| 5,598,221 A | * | 1/1997 | Miyahara et al. ............ | 348/554 |
| 5,805,234 A | * | 9/1998 | Matsuura ...................... | 348/558 |
| 5,923,378 A | * | 7/1999 | Limberg ....................... | 348/555 |
| 6,061,096 A | * | 5/2000 | Limberg ....................... | 348/555 |
| 6,108,044 A | * | 8/2000 | Shin .............................. | 348/555 |

FOREIGN PATENT DOCUMENTS

| | | | | |
|---|---|---|---|---|
| JP | 64-25684 | 1/1989 | ............. | H04N/5/91 |
| JP | 1-137890 | 5/1989 | ............. | H04N/5/46 |
| JP | 1-200788 | 8/1989 | ............. | H04N/5/46 |
| JP | 4-248782 | 9/1992 | ............. | H04N/7/00 |
| JP | 4-369189 | 12/1992 | ............. | H04N/5/46 |

* cited by examiner

Primary Examiner—Michael Lee
Assistant Examiner—Paulos Natnael
(74) Attorney, Agent, or Firm—Sughrue Mion, PLLC

(57) ABSTRACT

Circuit and method for determining a received signal for a receiver such as a simulcast receiver or an HDTV receiver are provided. The circuit includes a first detector for detecting a first reference signal included in a received signal and outputting a first detection signal, and a second detector for detecting a second reference signal included in the received signal and outputting a second detection signal. The circuit also includes a generator for generating a determination signal which indicates that the received signal is an analog broadcasting signal in the event the first detection signal is detected, and indicates that the received signal is a high definition signal in the event if the second detection signal is detected. Therefore, the received signal can be determined correctly, according to channel selection.

20 Claims, 5 Drawing Sheets

CIRCUIT AND METHOD FOR DETERMINING RECEIVED SIGNAL

BACKGROUND OF THE INVENTION

1. Field of the Invention

The present invention relates to a receiver, and more particularly, to a circuit for determining whether a received signal is a high-definition television (HDTV) signal or an analog TV signal, and to a method therefor.

2. Description of Related Art

Tests have been completed of a "Grand Alliance" (GA) advanced television (ATV) system, which is a new digital television transmission system standard which can replace the analog national television system committee (NTSC) broadcasting system. A GA-ATV system (also called GA-HDTV or GA-VSB) is standardized by the advanced television system committee (ATSC), and adopts a vestigial side band (VSB) modulation method for digital transmission.

However, when full-scale HDTV broadcasting starts, it cannot avoid coexistence with an existing analog broadcasting system (here, NTSC). Also, a receiver must allow a viewer to watch either HDTV or NTSC broadcasting at will. That is, a channel may be for NTSC TV broadcasting in some areas and for HDTV broadcasting in other areas, so a receiver must have a structure by which either of the two broadcastings can be selected and viewed. Such a simulcast receiver for receiving both HDTV and NTSC TV signals is usually comprised of a tuner, an HDTV signal processor for processing HDTV signals, an NTSC TV signal processor for processing NTSC TV signals, and a display. Accordingly, before an HDTV or NTSC TV signal is selected and displayed on the single display, it must be determined whether the current received signal is an HDTV or NTSC TV signal. A receiver for receiving the HDTV signal also requires a circuit for determining whether the current received signal is an HDTV or NTSC TV signal, in order to display whether a channel selected by a user is an HDTV or NTSC TV channel.

SUMMARY OF THE INVENTION

It is an object of the present invention to provide a circuit for correctly determining whether a received signal is an HDTV signal or an analog TV signal upon channel selection in a simulcast receiver.

It is another object of the present invention to provide a circuit for correctly determining whether a received signal is an HDTV signal or an analog TV signal in an HDTV receiver.

It is still another object of the present invention to provide a method for correctly determining whether a received signal is an HDTV signal or an analog TV signal.

It is yet another object of the present invention to provide a method for selecting a received signal in order of priority according to selection of channels, when an HDTV signal and an analog TV signal are simultaneously received.

It is still yet another object of the present invention to provide a method for correctly determining a received signal according to channel selection when an HDTV signal and an analog TV signal are separately processed in a simulcast receiver.

It is further another object of the present invention to provide a method for correctly determining a received signal according to channel selection when an HDTV signal and an analog TV signal are partially processed together in a simulcast receiver.

To accomplish the above objects, a circuit is provided for determining a received signal. This circuit includes both a first detector for detecting a first reference signal included in a received signal and outputting a first detection signal, and a second detector for detecting a second reference signal included in the received signal and outputting a second detection signal. The circuit also includes a generator for generating a determination signal which indicates that the received signal is an analog broadcasting signal, in the event the first detection signal is detected, and which indicates that the received signal is a high definition signal, in the event the second detection signal is detected.

Also, a method is provided for determining whether a received signal is a high-definition signal having a digital format or an analog broadcasting signal. This method includes the step of detecting a first reference signal included in the received signal and outputting a first detection signal, and the step of detecting a second reference signal included in the received signal and outputting a second detection signal. The method also includes the step of generating a determination signal which indicates that the received signal is an analog broadcasting signal if the first detection signal is detected, and which indicates that the received signal is a high definition signal if the second detection signal is detected.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
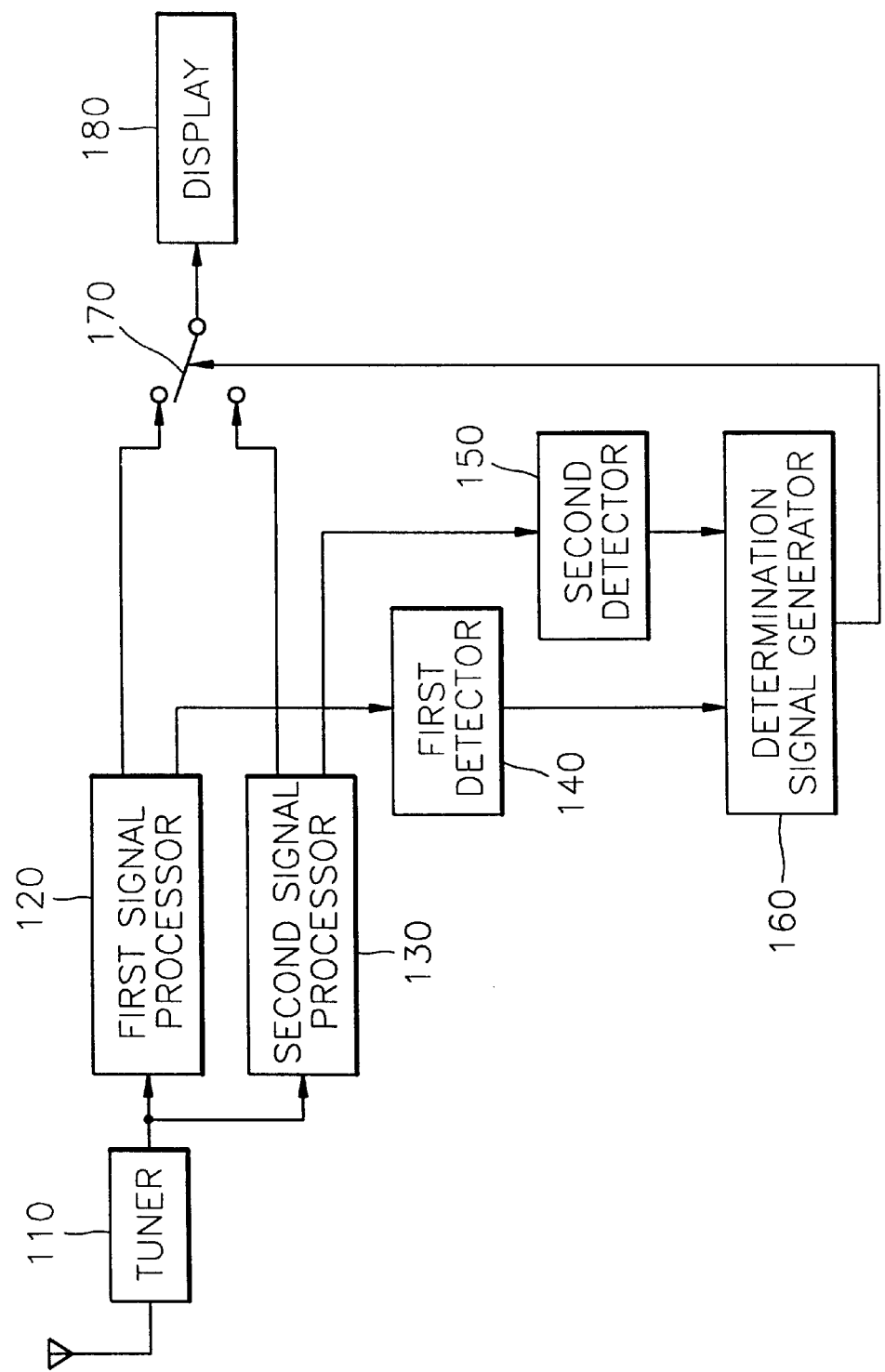
FIG. 1 is a block diagram of a received signal determining circuit in a simulcast receiver according to an embodiment of the present invention.

Referring to FIG. 1, a simulcast receiver for receiving both HDTV and NTSC TV signals, according to the present invention, includes a tuner 110, first and second signal processors 120 and 130 for processing NTSC TV and HDTV signals, respectively, and a display 180. Accordingly, a determination of whether a current received signal is the HDTV or NTSC TV signal must be made to selectively display either the HDTV or NTSC TV signal on a single display 180. A determining circuit for performing the above-described determination includes a first detector 140, a second detector 150 and a determination signal generator 160. A selector 170 selects either an NTSC TV signal demodulated by the first signal processor 120 or an HDTV signal demodulated by the second signal processor 130, according to a determination signal generated from the determination signal generator 160.

The first detector 140 of the determination circuit determines the existence or non-existence of the NTSC TV signal according to whether a vertical or horizontal synchronous signal exists, and outputs a first detection signal which is "high" if the synchronous signal exists and "low" if not. Alternatively, the existence or non-existence of the NTSC TV signal can be determined by a ghost cancellation reference (GCR) signal transmitted for a vertical blanking period to remove ghosting, in addition to using the determination of the synchronous signal. In this case, a determination of whether the NTSC TV signal exists is made by checking a correlation between the GCR signal and the received signal.

A ghosting phenomenon, where a shadow image is generated on a TV screen, occurs because an electromagnetic wave emitted from a broadcasting station is reflected by a mountain, a building, etc. In order to remove such a ghosting phenomenon, the broadcasting station transmits a predetermined reference signal (here, GCR signal) to allow a receiver to know the characteristics of a transmission channel. Then, the receiver understands the ghosting characteristics of a channel using the reference signal transmitted, and filters a received image signal accordingly. A GCR signal for removing the ghosting and a device therefor are disclosed in U.S. Pat. No. 5,389,977 issued to the present applicant.

The second detector 150 detects a field or segment synchronous signal included in the HDTV signal to determine whether the HDTV signal exists. That is, since a field synchronous segment of the HDTV signal is formed in a predetermined pseudo number (PN) sequence, the existence or non-existence of the HDTV signal can be determined by an inspection of the correlation between a received signal and a pre-stored reference signal.

Figure 4:
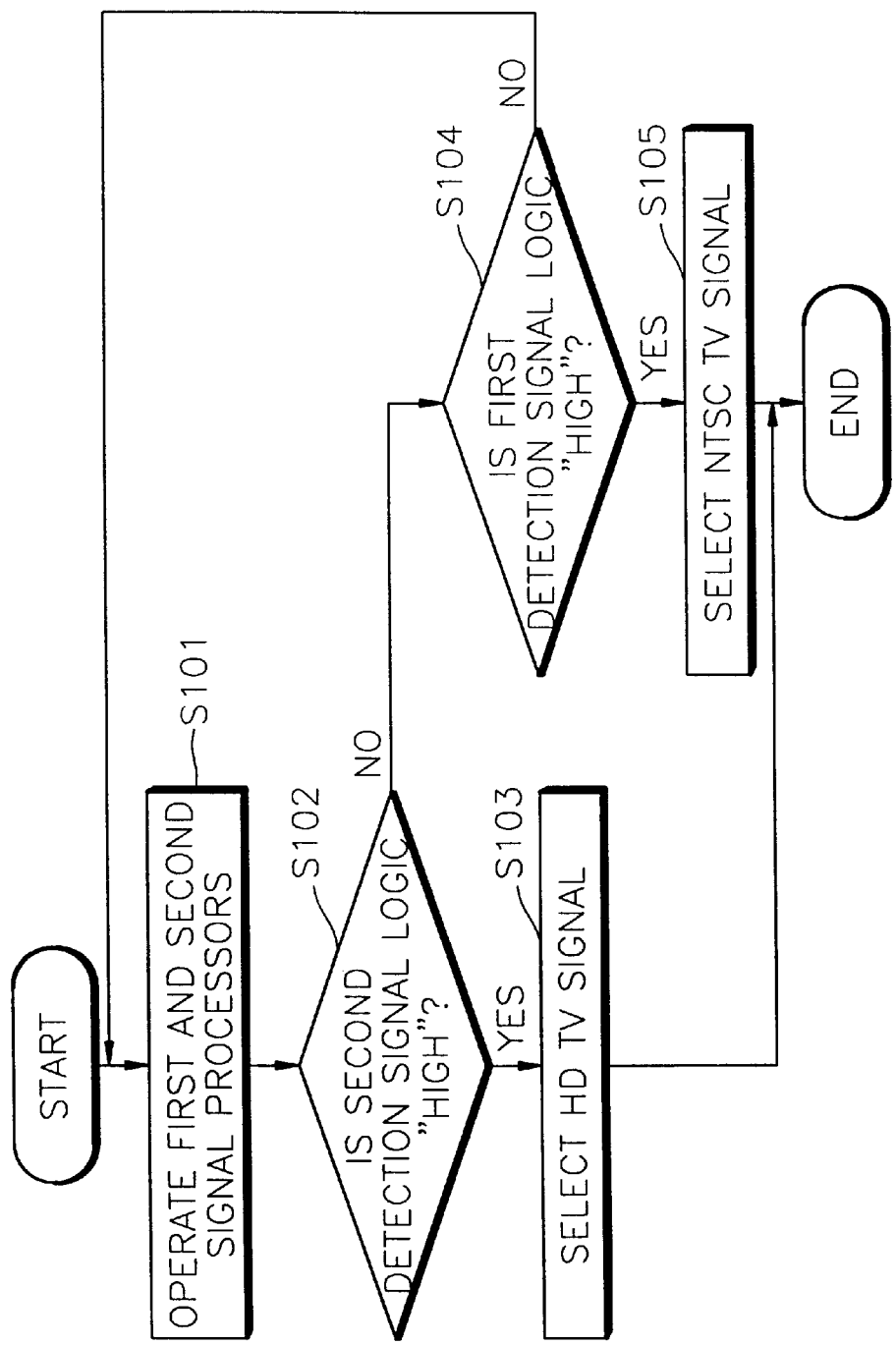
FIG. 4 is a flow chart illustrating a method for determining a received signal, according to an embodiment of the present invention.

Thus, the second detector 150 also outputs a second detection signal which is "high" if a field or segment synchronous signal exists in a signal output from the second signal processor 130, and is "low" if not. The determination signal generator 160 receives the first and second detection signals from the first and second detectors 140 and 150, and outputs a determination signal to the selector 170 to output a proper signal corresponding to a channel selected by determining a received signal as shown in FIG. 4. It is preferable that the existence or non-existence of the HDTV signal is first determined since an HDTV signal is generally transmitted at a lower power than is an NTSC TV signal.

Figure 2:
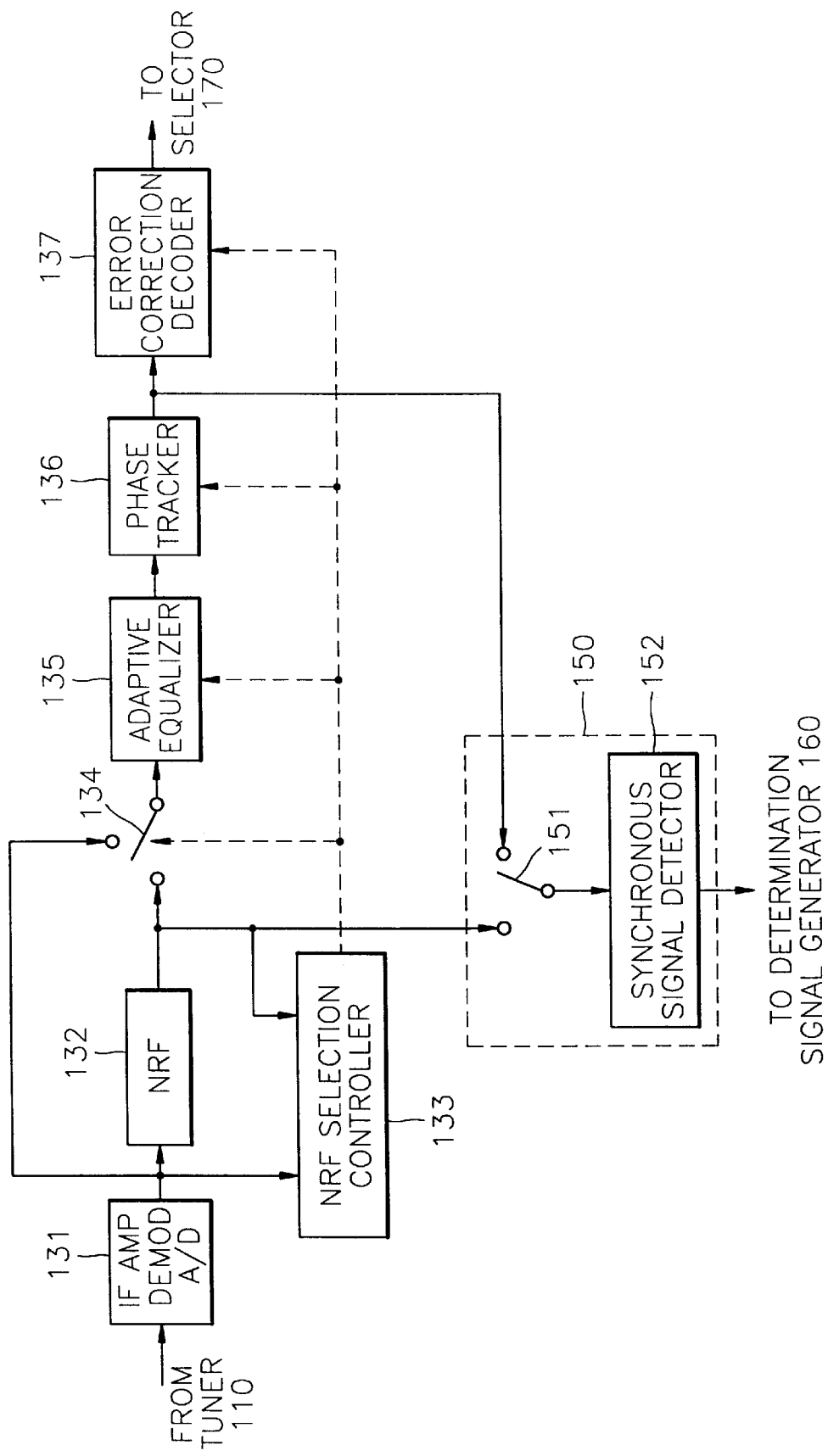
FIG. 2 is a block diagram of a second signal processor and a second detector shown in FIG. 1.

FIG. 2 is a block diagram of an example of the second signal processor 130 and a second detector 150. Referring to FIG. 2, elements from a block 131 to an error correction decoder 137 correspond to the second signal processor 130.

The block 131 controls the amplitude of an IF signal output from the tuner 110 shown in FIG. 1, demodulates the IF signal to a base-band signal using a pilot signal included in the IF signal, and converts the demodulated signal into digital data. An NTSC rejection filter (NRF) 132 removes an NTSC component from the output of the block 131 to prevent degradation of the HDTV signal by the NTSC TV signal. Here, the NRF 132 may be constituted of a comb filter, as a representative example.

An NRF selection controller 133 generates a selection signal for selecting the path having a smaller error out of a path having passed through the NRF 132 and a path having not passed therethrough, and applies the selection signal to a first selector 134, an adaptive equalizer 135, a phase tracker 136 and the error correction decoder 137. The first selector 134 selects either a signal (15-level) which has passed through the NRF 132 or the output signal (8-level) of the block 131 which has not passed through the NRF 132, according to the selection signal. The adaptive equalizer 135, the phase tracker 136 and the error correction decoder 137 are operated to adapt to a selected signal state.

The adaptive equalizer 135 removes multipath distortion (another name for ghosting) included in the signal selected by the first selector 134. The phase tracker 136 removes a phase error, i.e., phase noise, in the equalized signal output from the adaptive equalizer 135. The error correction decoder 137 error-correction decodes the output of the phase tracker 136.

Meanwhile, a second selector 151 of the second detector 150 shown in FIG. 1 selects either a signal from which co-channel interference has been removed, output from the NRF 132, or a signal output from the phase tracker 136. The signal selected by the second selector 151 is output to a synchronous signal detector 152. Here, the output signal of the phase tracker 136 is a signal from which other interferences, i.e., moving ghosting and phase noise, as well as the co-channel interference, have been removed. The adaptive equalizer 135 and the phase tracker 136 can be called a post-processor.

The synchronous signal detector 152 detects a field or segment synchronous signal included in a signal selected by the second selector 151, and outputs a first detection signal which is logic "high" signal if the field or segment synchronous signal is detected, and is logic "low" signal if not.

Figure 3:
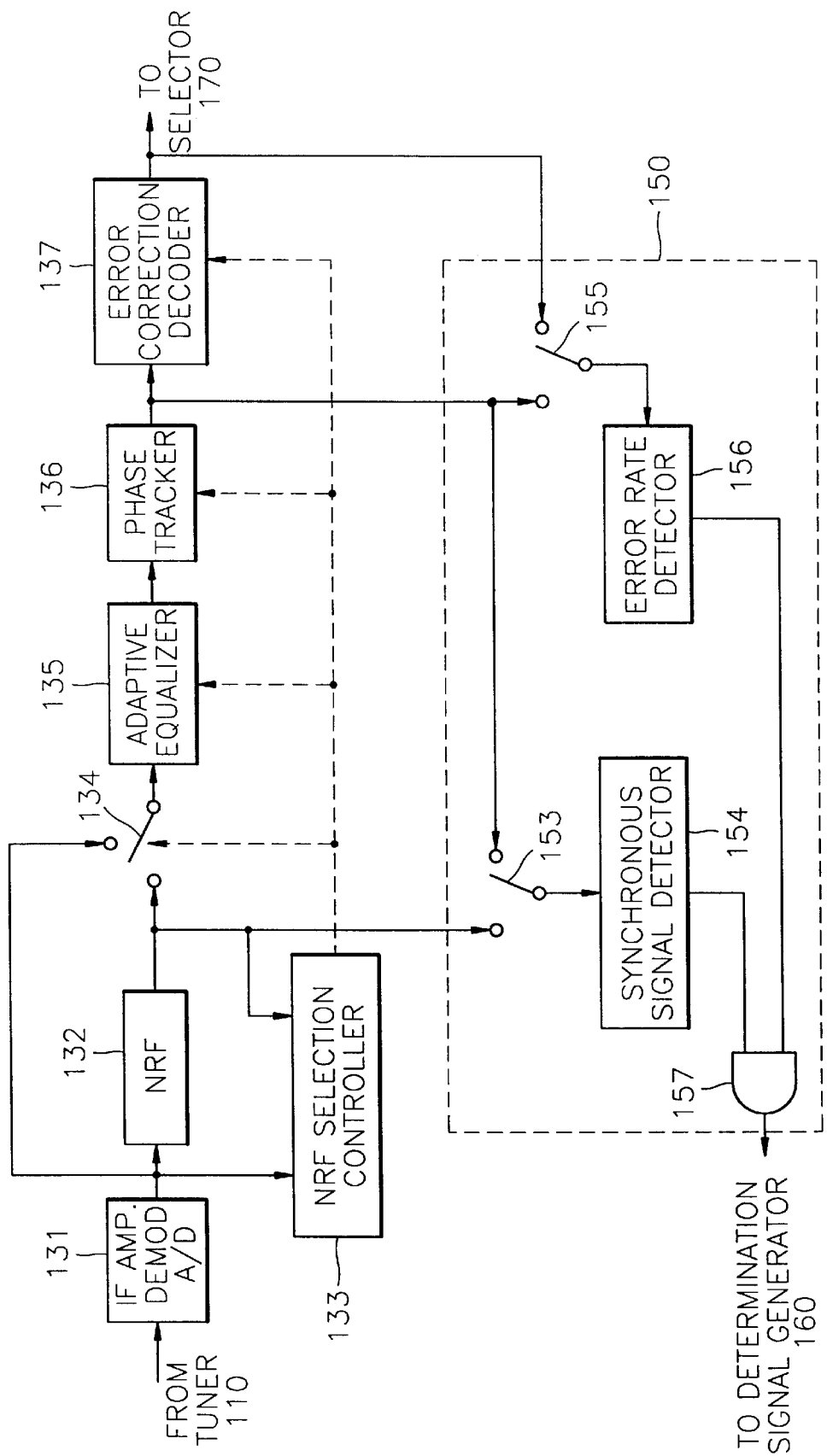
FIG. 3 is another block diagram of a second signal processor and a second detector shown in FIG. 1.

FIG. 3 is a block diagram of another example of the second signal processor 130 and the second detector 150 shown in FIG. 1. Elements from a block 131 through to an error correction decoder 137 constitute the second signal processor 130. A second selector 153, a synchronous signal detector 154, a third selector 155, an error rate detector 156 and an AND gate 157 constitute the second detector 150, are omitted from this description. The second detector 150 shown in FIG. 3 determines that a signal exists only when an error rate is lower than or equal to a predetermined value, by detecting both a synchronous signal and an error rate.

That is, the synchronous signal detection is performed by the second selector 153 and the synchronous signal detector 154. The error rate detection is performed by the third selector 155 and the error rate detector 156. The third selector 155 selects either the output of the phase tracker 136 or the output of the error correction decoder 137. If the output of the phase tracker 136 is selected by the third selector 155, the error rate detector 156 obtains a symbol error rate by comparing a signal processed by the phase tracker 136 with a known signal (e.g., a 511PN signal) in a field synchronous segment, since the output signal of the phase tracker 136 exists in a symbol state. The error detector 156 outputs a logic "high" signal if the obtained error rate is less than or equal to a predetermined threshold value, and otherwise outputs a logic "low" signal.

Similarly, if the output of the error correction decoder 137 is selected by the third selector 155, then since a bit error rate (BER) can be estimated using a signal (here, a flag) which indicates the restoration or non-restoration of a bit error-corrected by the error correction decoder 137, the error rate detector 156 accumulates a flag output from the error correction decoder 137 and compares the estimated BER with a predetermined threshold value. Then, a logic "high" is output when the BER is less than or equal to a threshold value, and, otherwise, a logic "low" is output.

An AND gate 157 performs an AND operation on the output signals of the synchronous signal detector 154 and the error rate detector 156, and outputs a second detection signal. When the output signals of the synchronous signal detector 154 and the error rate detector 156 are both logic "high", a second detection signal of logic "high" is output, but otherwise, a second detection signal of logic "low" is output.

FIG. 4 is a flow chart illustrating a method for determining a received signal, according to an embodiment of the present invention. Operation of the first and second signal processors 120 and 130 to process a received signal as shown in FIG. 1 is illustrated by FIG. 4.

Referring to FIG. 4, a received signal is processed simultaneously in the first and second signal processors 120 and 130, in step S101. As described above, it is preferable that the existence of the HDTV signal is first checked since the HDTV signal is transmitted at lower power than the NTSC TV signal. Accordingly, the second detector 150 detects a synchronous (segment or field synchronous) signal from the HDTV signal processed in the second signal processor 130 and then outputs a second detection signal of logic "high" when the synchronous signal is detected, as shown in FIG. 2, in step S102. Or, the second detector 150 performs detections of a synchronous signal and an error rate, and then outputs a second detection signal of logic "high" when the synchronous signal is detected and the error rate is less than or equal to a threshold value, as shown in FIG. 3, in step S102. The determination signal generator 160 outputs to the selector 170 a determination signal for selecting the output of the second signal processor 130, when the second detection signal is logic "high", in step S103.

If a second detection signal of logic "low" is output from the second detector 150 in step S102, the first detector 140 detects a synchronous (horizontal or vertical synchronous) signal or a GCR signal from the NTSC TV signal processed by the first signal processor 120, and outputs a first detection signal of logic "high" if the synchronous signal or GCR signal is detected, in step S104. The determination signal generator 160 outputs to the selector 170 a determination signal for selecting the output of the first signal processor 120, if the first detection signal is logic "high", in step S105. If the first detection signal is logic "low" in step S104, the procedure returns to step S101, and then the steps following step S101 are repeated.

Figure 5:
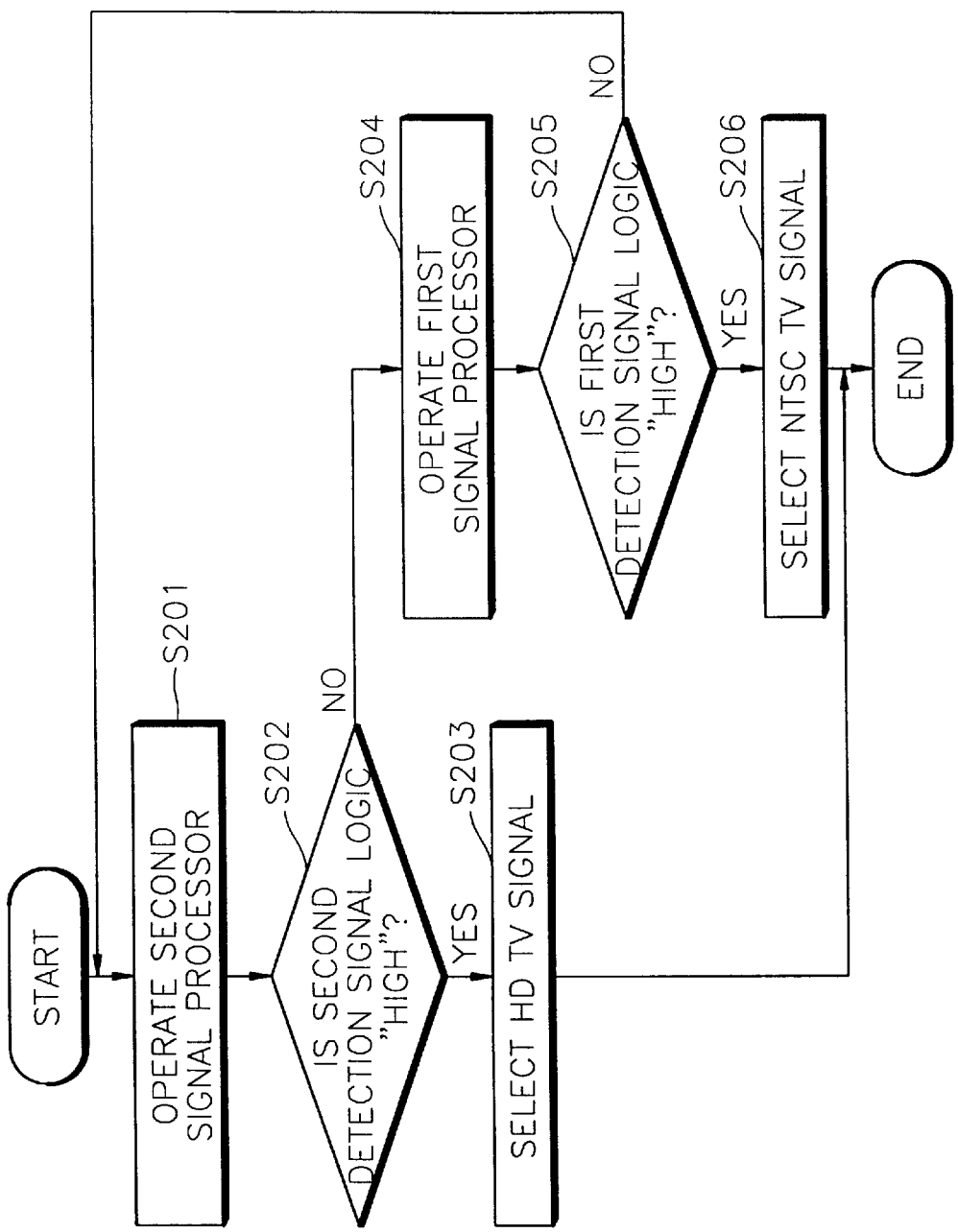
FIG. 5 is a flow chart illustrating a method for determining a received signal according to another embodiment of the present invention.

FIG. 5 is a flow chart illustrating a method for determining a received signal, according to another embodiment of the present invention. The simulcast receiver shown in FIG. 1 performs a signal processing operation in different ways, separately, but can share a pre-processor such as the block 131 shown in FIG. 2 according to circumstances. Accordingly, the determination method shown in FIG. 5 is proposed.

That is, first, the second signal processor 130 is operated to process a received signal, according to channel selection, in step S201. The second detector 150 detects a synchronous (segment or field synchronous) signal from the HDTV signal processed in the second signal processor 130 and outputs a second detection signal of logic "high" when the synchronous signal is detected, as shown in FIG. 2, in step S202. Or, the second detector 150 detects a synchronous signal and an error rate, and then outputs a second detection signal of logic "high" when the synchronous signal is detected and the error rate is less than or equal to the threshold value, as shown in FIG. 3, in step S202. The determination signal generator 160 outputs to the selector 170 a determination signal for selecting the output of the second signal processor 130, when the second detection signal is logic "high", in step S203.

If a second detection signal of logic "low" is output from the second detector 150 in step S202, the first signal processor 120 operates to process a received signal, in step S204. The first detector 140 detects a synchronous (horizontal or vertical synchronous) signal or a GCR signal from the NTSC TV signal processed by the first signal processor 120, and outputs a first detection signal of logic "high" if the synchronous signal or GCR signal is detected, in step S205. The determination signal generator 160 outputs to the selector 170 a determination signal for selecting the output of the first signal processor 120, if the first detection signal is logic "high", in step S206. If the first detection signal is also logic "low", in step S205, the procedure returns to step S201, and then the steps following step S201 are repeated.

The present invention can be applied not only to the simulcast receiver for receiving both analog broadcasting (NTSC TV) and HDTV signals, but also to a receiver for receiving a digital terrestrial wave HDTV signal which is scheduled to be broadcasted. That is, the HDTV receiver includes at least a signal processor for demodulating a received HDTV signal having a digital format into a base band and decoding the result, and a display for displaying caption data indicating whether a channel selected by a user according to a determination HDTV channel or an analog broadcasting TV (NTSC TV) channel. Also, the HD signal according to the present invention includes a standard definition (SD) signal.

As described above, in a simulcast receiver for receiving both an HDTV signal and an analog broadcasting signal when an HDTV broadcasting and an existing analog broadcasting coexist, or in an HDTV receiver, the present invention can correctly determine a received signal according to channel selection. Also, in the present invention, since the HDTV signal is transmitted at a lower power than the existing analog broadcasting TV signal, the HDTV signal is detected first to determine the received signal. Therefore, determination is more reliable.

Although the invention has been described in terms of preferred embodiments, persons of skill in the art will understand that the described embodiments may be changed in various ways without departing from the spirit and scope of the invention.

This application for a circuit and method for determining received signal is based on Korean Patent Application no. 97-36884, which is incorporated herein by reference for all purposes.

What is claimed is:

1. A circuit for determining a received signal, comprising:
    a first detector for detecting whether a ghost cancellation reference signal is included in a received signal and conditionally outputting a first detection signal;
    a second detector for detecting whether a second reference signal is included in the received signal and conditionally outputting a second detection signal; and
    a generator for generating a determination signal which indicates that the received signal is an analog broadcasting signal, if the first detection signal is detected, and indicates that the received signal is a high definition signal, if the second detection signal is detected.

2. A circuit for determining a received signal, comprising:
    a first detector for detecting whether a first reference signal is included in a received signal and conditionally outputting a first detection signal;
    a second detector for detecting whether a segment or field synchronous signal is included in the received signal and conditionally outputting a second detection signal; and
    a generator for generating a determination signal which indicates that the received signal is an analog broadcasting signal, if the first detection signal is detected, and indicates that the received signal is a high definition signal, if the second detection signal is detected.

3. A circuit for determining a received signal, comprising:

a first detector for detecting whether a first reference signal is included in a received signal and conditionally outputting a first detection signal;

a second detector for detecting whether a second reference signal is included in the received signal and conditionally outputting a second detection signal; and a generator for generating a determination signal which indicates that the received signal is an analog broadcasting signal, if the first detection signal is detected, and indicates that the received signal is a high definition signal, if the second detection signal is detected, wherein said second detector comprises a symbol error rate detector for detecting a symbol error rate of the received signal and outputting the second detection signal if the detected symbol error rate is less than or equal to a predetermined value.

4. A circuit for determining a received signal, comprising:

a first detector for detecting whether a first reference signal is included in a received signal and conditionally outputting a first detection signal;

a second detector for detecting whether a second reference signal is included in the received signal and conditionally outputting a second detection signal; and a generator for generating a determination signal which indicates that the received signal is an analog broadcasting signal, if the first detection signal is detected, and indicates that the received signal is a high definition signal, if the second detection signal is detected, wherein said second detector comprises a bit error rate detector for detecting a bit error rate of the received signal and outputting the second detection signal if the detected bit error rate is less than or equal to a predetermined value.

5. A circuit for determining a received signal by generating a determination signal, for use in a simulcast receiver which includes a tuner for receiving a HDTV signal having a digital format and an analog broadcasting TV signal, a first signal processor for demodulating and decoding the analog broadcasting TV signal output from said tuner, a second signal processor for demodulating and decoding the HDTV signal output from said tuner, and a display for displaying one of the output signals of said first and second signal processors which is selected according to a determination signal, the circuit comprising:

a first detector for detecting whether a ghost cancellation reference signal is included in the received signal and conditionally outputting a first detection signal;

a second detector for detecting whether a second reference signal is included in the received signal and conditionally outputting a second detection signal; and a generator for generating a determination signal which indicates that the received signal is an analog broadcasting TV signal, if the first detection signal is detected, and indicates that the received signal is an HDTV signal, if the second detection signal is detected.

6. A circuit for determining a received signal by generating a determination signal, for use in a simulcast receiver which includes a tuner for receiving a HDTV signal having a digital format and an analog broadcasting TV signal, a first signal processor for demodulating and decoding the analog broadcasting TV signal output from said tuner, a second signal processor for demodulating and decoding the HDTV signal output from said tuner, and a display for displaying one of the output signals of said first and second signal processors which is selected according to a determination signal, the circuit comprising:

a first detector for detecting whether a first reference signal is included in the received signal and conditionally outputting a first detection signal;

a second detector for detecting whether a second reference signal is included in the received signal and conditionally outputting a second detection signal; and a generator for generating a determination signal which indicates that the received signal is an analog broadcasting TV signal, if the first detection signal is detected, and indicates that the received signal is an HDTV signal, if the second detection signal is detected, wherein said second signal processor comprises:

a demodulator for demodulating the HDTV signal output from said tuner and outputting a first signal;

a co-channel interference remover for removing co-channel interference from the first signal and outputting a second signal;

a first selector for selecting either the first or second signal according to a selection signal and outputting a selected signal;

a post-processor for removing additional interference from the selected signal and outputting a post-processed signal; and a selection controller for determining whether the co-channel interference is included in the post-processed signal, and generating the selection signal, and wherein said second detector comprises:

a second selector for selecting either the second signal or the post-processed signal; and a synchronous signal detector for checking a signal selected by said second selector for a correlation between the second reference signal and a reference pattern, and outputting a second detection signal.

7. The circuit for determining a received signal as claimed in claim 6, wherein the second reference signal is a segment or field synchronous signal.

8. The circuit for determining a received signal as claimed in claim 6, wherein said second detector further comprises:

a symbol error rate detector for detecting a symbol error rate of the post-processed signal and determining whether the detected symbol error rate is less than or equal to a predetermined value; and a logic circuit for performing an AND operation on the outputs of said synchronous signal detector and said symbol error rate detector and outputting a second detection signal.

9. The circuit for determining a received signal as claimed in claim 6, wherein said second signal processor further comprises:

an error correction decoder for error-correction decoding the post-processed signal and outputting an indication signal for indicating whether an error-corrected bit is restored, and wherein said second detector further comprises:

a bit error rate detector for detecting a bit error rate by accumulating the indication signals, and determining whether the detected bit error rate is less than or equal to a predetermined value; and a logic circuit for performing an AND operation on the outputs of said synchronous detector and said bit error rate detector and outputting a second detection signal.

10. A circuit for determining a received signal by generating a determination signal, for use in a high-definition signal receiver which includes a signal processor for demodulating and decoding a received HDTV signal having a digital format, and a display for displaying caption data indicating whether a channel selected by a user according to the determination signal is a HDTV channel or an analog broadcasting TV channel, said circuit comprising:

a first detector for detecting whether a ghost cancellation reference signal is included in the received signal and conditionally outputting a first detection signal;

a second detector for detecting whether a second reference signal is included in the received signal and conditionally outputting a second detection signal; and a generator for generating a determination signal which indicates that the received signal is an analog broadcasting TV signal, if the first detection signal is detected, and indicates that the received signal is an HDTV signal, if the second detection signal is detected.

11. A circuit for determining a received signal by generating a determination signal, for use in a high-definition signal receiver which includes a signal processor for demodulating and decoding a received HDTV signal having a digital format, and a display for displaying caption data indicating whether a channel selected by a user according to the determination signal is a HDTV channel or an analog broadcasting TV channel, said circuit comprising:

a first detector for detecting whether a first reference signal is included in the received signal and conditionally outputting a first detection signal;

a second detector for detecting whether a segment or field synchronous signal is included in the received signal and conditionally outputting a second detection signal; and a generator for generating a determination signal which indicates that the received signal is an analog broadcasting TV signal, if the first detection signal is detected, and indicates that the received signal is an HDTV signal, if the second detection signal is detected.

12. A circuit for determining a received signal by generating a determination signal, for use in a high-definition signal receiver which includes a signal processor for demodulating and decoding a received HDTV signal having a digital format, and a display for displaying caption data indicating whether a channel selected by a user according to the determination signal is a HDTV channel or an analog broadcasting TV channel, said circuit comprising:

a first detector for detecting whether a first reference signal is included in the received signal and conditionally outputting a first detection signal;

a second detector for detecting whether a second reference signal is included in the received signal and conditionally outputting a second detection signal; and a generator for generating a determination signal which indicates that the received signal is an analog broadcasting TV signal, if the first detection signal is detected, and indicates that the received signal is an HDTV signal, if the second detection signal is detected, wherein said second detector comprises a symbol error rate detector for detecting a symbol error rate of the received signal and outputting the second detection signal if the detected symbol error rate is less than or equal to a predetermined value.

13. A circuit for determining a received signal by generating a determination signal, for use in a high-definition signal receiver which includes a signal processor for demodulating and decoding a received HDTV signal having a digital format, and a display for displaying caption data indicating whether a channel selected by a user according to the determination signal is a HDTV channel or an analog broadcasting TV channel, said circuit comprising:

a first detector for detecting whether a first reference signal is included in the received signal and conditionally outputting a first detection signal;

a second detector for detecting whether a second reference signal is included in the received signal and conditionally outputting a second detection signal; and a generator for generating a determination signal which indicates that the received signal is an analog broadcasting TV signal, if the first detection signal is detected, and indicates that the received signal is an HDTV signal, if the second detection signal is detected, wherein said second detector comprises a bit error rate detector for detecting a bit error rate of the received signal and outputting the second detection signal if the detected bit error rate is less than or equal to a predetermined value.

14. A method for determining whether a received signal is a high-definition signal having a digital format or an analog broadcasting signal, comprising the steps of:

(a) detecting whether a first reference signal is included in the received signal and conditionally outputting a first detection signal;

(b) detecting whether a segment or field synchronous signal is included in the received signal and conditionally outputting a first detection signal; and (c) generating a determination signal which indicates that the received signal is an analog broadcasting signal, if the first detection signal is detected, and indicates that the received signal is a high definition signal, if the second detection signal is detected, wherein the first reference signal is selected from the group consisting of a horizontal synchronous signal, a vertical synchronous signal, and a ghost cancellation reference signal.

15. A method for determining a received signal by generating a determination signal, in a simulcast receiver including a tuner for receiving an HDTV signal having a digital format and an analog broadcasting TV signal, a first signal processor for demodulating and decoding the analog broadcasting TV signal output from said tuner to a base band, a second signal processor for demodulating and decoding the HDTV signal output from said tuner, and a display for displaying one of the output signals of said first and second signal processors which is selected according to the determination signal, said method comprising the steps of:

(a) simultaneously operating said first and second signal processors;

(b) detecting whether a second reference signal is included in a signal processed by said second signal processor and conditionally outputting a second detection signal;

(c) generating a determination signal for selecting the HDTV signal, according to the second detection signal, only if the second detection signal is detected;

(d) detecting whether a first reference signal is included in a signal processed by said first signal processor and conditionally outputting a first detection signal, only if the second detection signal is not detected;

(e) generating a determination signal for selecting the analog broadcasting TV signal, according to the first detection signal, if the first detection signal is detected; and (f) if the first detection signal is not detected, the steps (a) through (f) are repeated.

16. The method for determining a received signal as claimed in claim 15, wherein the first reference signal is selected from the group consisting of: a horizontal synchronous signal, a vertical synchronous signal, and a ghost cancellation reference signal.

17. The method for determining a received signal as claimed in claim 15, wherein the second reference signal is a segment or field synchronous signal.

18. A method for determining a received signal by generating a determination signal, in a simulcast receiver including a tuner for receiving a HDTV signal having a digital format and an analog broadcasting TV signal, a preprocessor for demodulating a signal output from said tuner, a first signal processor for decoding the analog broadcasting TV signal output from said preprocessor, a second signal processor for decoding the HDTV signal output from said preprocessor, and a display for displaying the output signal of one of said first and second signal processors which is selected according to the determination signal, said method comprising the steps of:

(a) operating said second signal processor;

(b) detecting whether a second reference signal is included in a signal processed by said second signal processor and conditionally outputting a second detection signal;

(c) generating a determination signal for selecting the HDTV signal, according to the second detection signal, if the second detection signal is detected;

(d) operating said first signal processor, only if the second detection signal has not been detected;

(e) detecting whether a first reference signal is included in a signal processed by said first signal processor and conditionally outputting a first detection signal; and (f) generating a determination signal for selecting the analog broadcasting TV signal, according to the first detection signal, if the first detection signal is detected;

(g) repeating the steps (a) through (g), if the first detection signal is not detected.

19. The method for determining a received signal as claimed in claim 18, wherein the first reference signal is selected from the group consisting of: a horizontal synchronous signal, a vertical synchronous signal, and a ghost cancellation reference signal.

20. The method for determining a received signal as claimed in claim 18, wherein the second reference signal is a segment or field synchronous signal.

* * * * *